E. W. MULLER.
CORRECTING FAULTS IN TUBULAR MEMBERS.
APPLICATION FILED AUG. 4, 1916.

1,354,576. Patented Oct. 5, 1920.
4 SHEETS—SHEET 1.

WITNESSES

INVENTOR
Ernest W. Muller

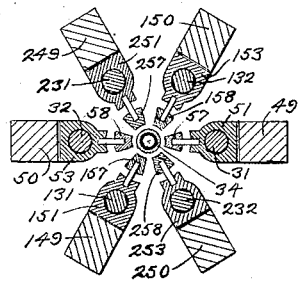
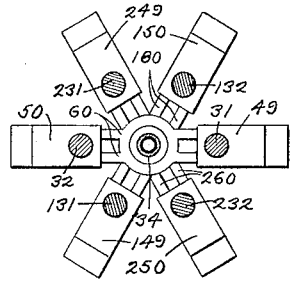
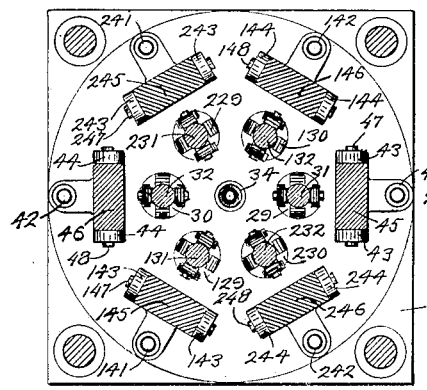
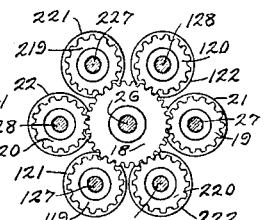
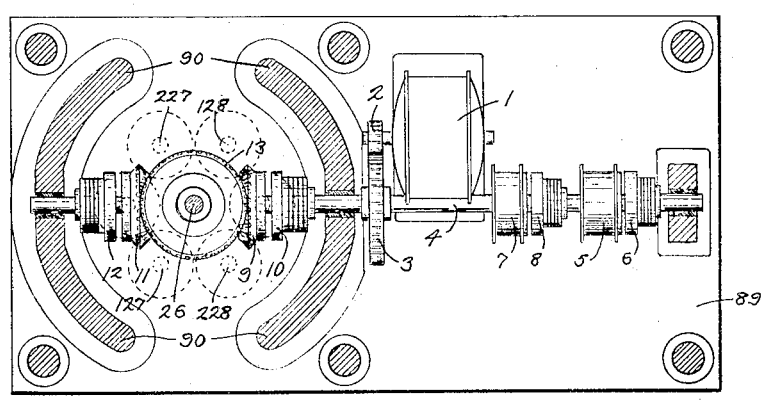

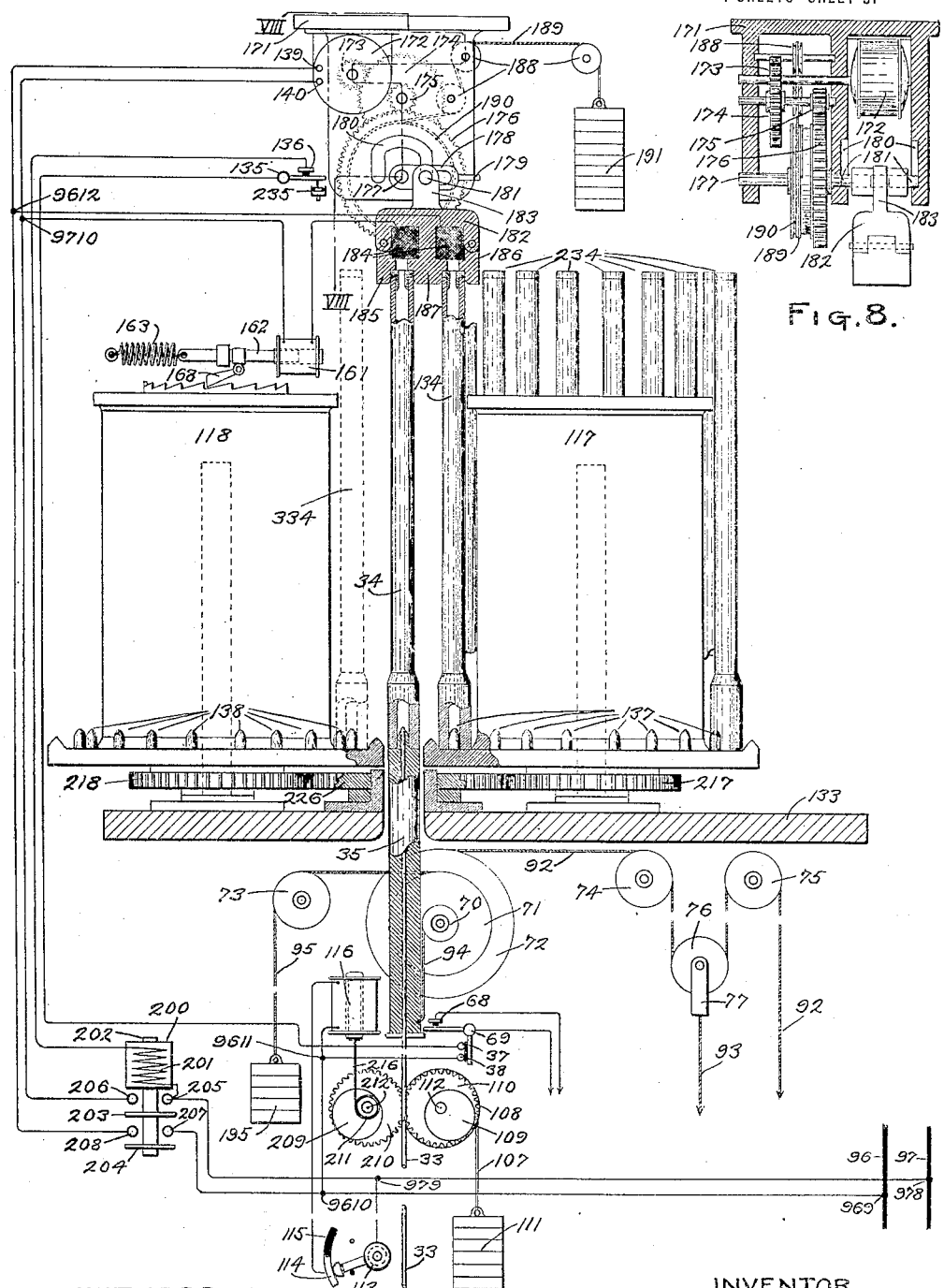

E. W. MULLER.
CORRECTING FAULTS IN TUBULAR MEMBERS.
APPLICATION FILED AUG. 4, 1916.
1,354,576.
Patented Oct. 5, 1920.
4 SHEETS—SHEET 4.
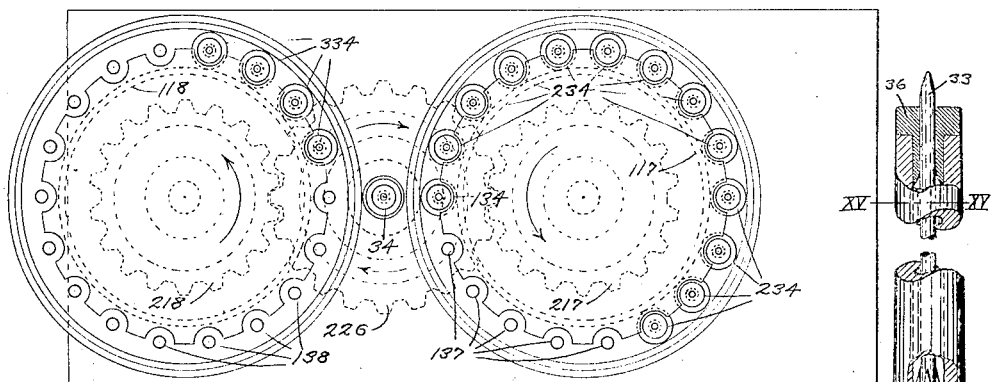
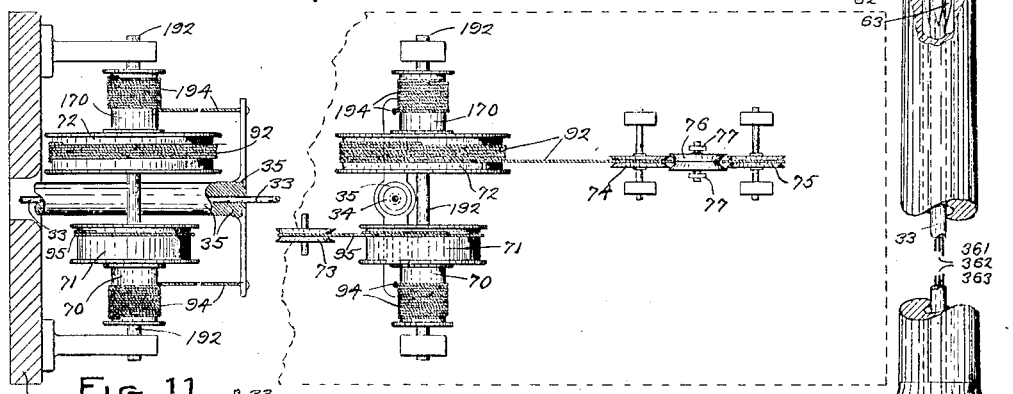
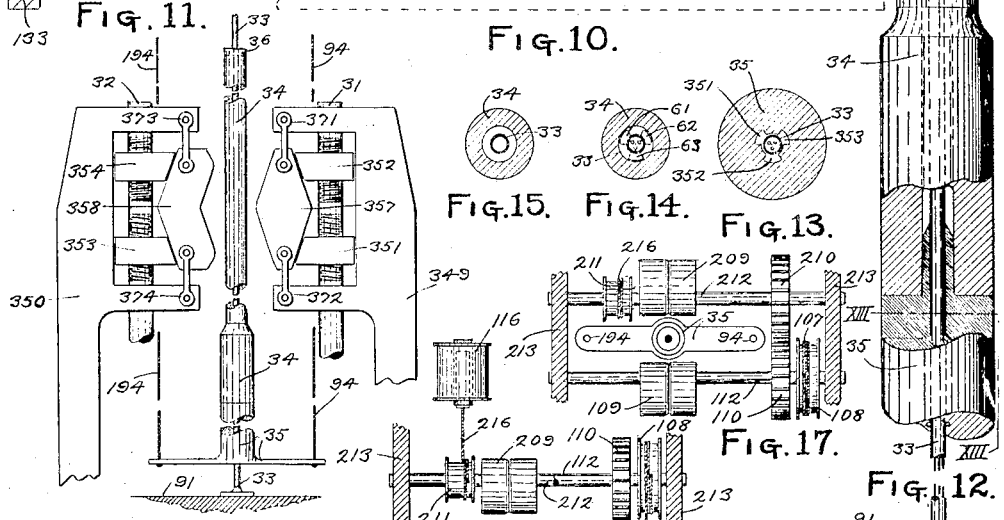
WITNESSES
INVENTOR
Ernest W. Muller

UNITED STATES PATENT OFFICE.

ERNEST W. MULLER, OF BROOKLYN, NEW YORK.

CORRECTING FAULTS IN TUBULAR MEMBERS.

1,354,576.    Specification of Letters Patent.    Patented Oct. 5, 1920.

Application filed August 4, 1916. Serial No. 113,065.

*To all whom it may concern:*

Be it known that I, ERNEST W. MULLER, a citizen of the United States, and a resident of the borough of Brooklyn, in the county of Kings, city and State of New York, have invented certain new and useful Improvements in Correcting Faults in Tubular Members; and I do hereby declare the following to be a full, clear, and exact description of the invention, such as will enable others skilled in the art to which it appertains to make and use the same.

The present invention relates to an electrical and mechanical combination of mechanisms for automatically finding and correcting faults such as bends, kinks or deflections in the bore of a gun barrel or other tubular member.

The invention also includes mechanism for feeding defective gun barrels or tubes one after the other to the fault locating and correcting apparatus, and after the faults have been located and corrected, a means of automatically ejecting the gun barrel or tubular members is provided.

The invention further includes an arrangement of the electrical apparatus and circuits whereby each of the several steps in the operation of the entire apparatus may be carried out without interference from the parts of the apparatus which perform the other steps.

The drawings accompanying this application cover in diagrammatic form the mechanical details, electrical connections and general arrangements of one embodiment of an automatic appliance or method of locating and correcting defects in gun barrels or tubular members as set forth in the following specification.

Fig. 2 shows the lower base plan of the machine in section along the line II—II of Fig. 1;

Fig. 3 shows a section through the lower gear assembly along the line III—III of Fig. 1;

Fig. 4 shows a plan of the bending movement base along the line IV—IV of Fig. 1;

Fig. 5 shows a section through the bending movement part of the machine on the line V—V of Fig. 1;

Fig. 6 shows a plan view of the top of the bending movement assembly on the line VI—VI of Fig. 1;

Fig. 7 shows an elevational section and diagram of the electrical connections of the automatic feeding and ejecting portion of the apparatus, and also the general arrangement and electrical connections of the automatic tension device for the detector tube of the machine;

Fig. 8 shows a section along the line VIII—VIII of Fig. 7 through the magnetic lifting device which forms a part of the automatic feeding and ejecting mechanism of the apparatus;

Fig. 9 shows a plan view of the revolving carriage and transfer equipment;

Fig. 10 shows a view from below the carrier platform of the gun barrel cable lifting and handling drums, shafting, pulleys, etc.;

Fig. 11 shows a side elevation of the same drums and the mode of suspension of the gun barrel, lifting cradle support, etc.;

Fig. 12 shows an enlarged elevation partly in section of a gun barrel with a detector tube therein as well as the arrangement of guide bushings and contact bars;

Fig. 13 shows a section of the gun barrel lifting support along the line XIII—XIII of Fig. 12;

Fig. 14 shows a section of the gun barrel and detector tube along the line XIV—XIV of Fig. 12;

Fig. 15 shows a section through the gun barrel and detector tube along the line XV—XV of Fig. 12;

Fig. 16 shows a modified form of bending apparatus that may be employed instead of the form illustrated in Fig. 1;

Fig. 17 shows a plan view of the automatic tension device assembly for the detector tube of the apparatus;

Fig. 18 shows a side elevation of a part of the same device;

Fig. 19 shows an enlarged view of the contacts of one of the detector relays;

Fig. 20 shows a similar enlarged view of the contacts of a second detector relay;

Fig. 21 shows an enlarged view of the contacts of a third detector relay.

Figure 1:
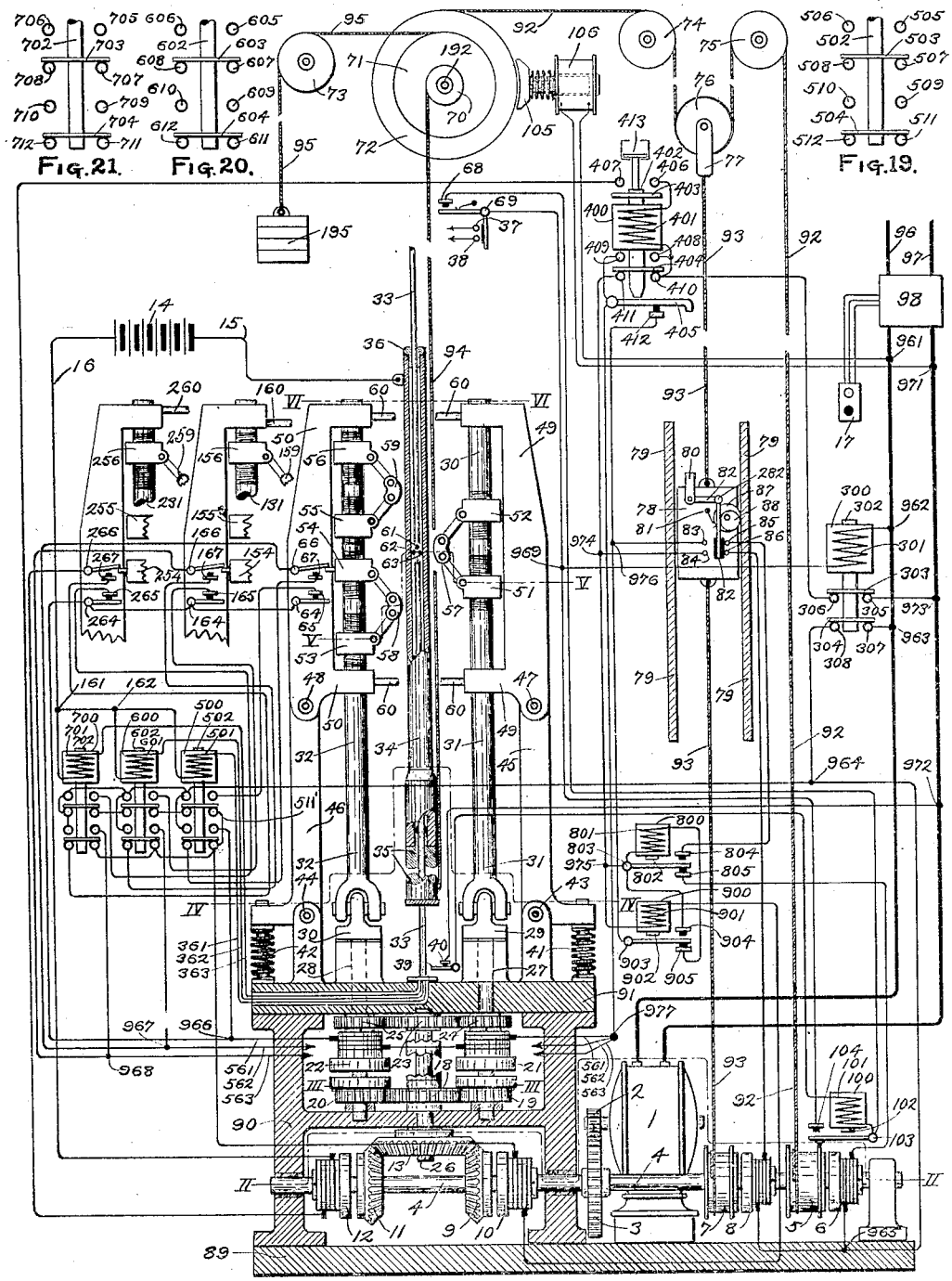
Figure 1 shows in elevational section and diagrammatic form the general arrangement of the lower portion of the machine as well as the electrical circuit connections thereof.

In the following description, like reference numerals refer to like parts throughout the several figures of the drawings. While a consecutive numbering of the various parts of the several appliances and parts of the electrical circuits has been adhered to as much as possible, the numbering is not in all cases consecutive, because it is desired, on account of the many numbers used and the complexity of the circuit connections and details of mechanical appliances, to use a system of numbering that will be easy to follow. It should also be explained that where the expression "bending movement" is used in the following specification and claims, it refers to the bending movement necessary to correct deflections or bends in a gun barrel or other tubular member.

Referring particularly to Fig. 1, a main driving motor 1 has a pinion 2 meshing with a gear 3 on the main operating shaft 4 mounted in suitable bearings in the framework 90 mounted upon the base 89 of the machine. A primary winding drum 5 is loosely mounted on shaft 4 and is free to rotate in one direction only with shaft 4 when electro-magnetic clutch 6 is energized and is free to rotate in the opposite direction when the clutch is deënergized and the pawl or ratchet arm 103 is lifted from the ratchet teeth of the rim of the primary winding drum 5 by electromagnet 100. This winding drum is designed for winding a cable for lifting the gun barrel support. A secondary winding drum 7 is also loosely mounted on the shaft 4 and is adapted to rotate therewith when an electro-magnetic clutch 8 is energized, but is free to rotate in the opposite direction when the clutch 8 is deënergized. This secondary winding drum is designed for winding another cable for lifting a gun barrel during another step in the operation of the apparatus.

The bending movement bevel gear 11 is also loosely mounted on the shaft 4 and is free to rotate in either direction with a chain of gears with which it is in mesh. When an electro-magnetic clutch 12 is magnetized this bevel gear will rotate with shaft 4 and will drive through main bevel gear 13 and central gear 18 on shaft 26 the three pairs of opposite gears 19—20, 119—120, and 219—220 (Fig. 3). The resetting bending movement bevel gear 9 also loosely mounted on shaft 4 is free to rotate in either direction with a chain of gears with which it is in mesh. When electro-magnetic clutch 10 is energized this bevel gear will rotate with shaft 4 and drive in the reverse direction the same chain of gears driven by bevel gear 11.

The low potential or separate electric current supply 14 for the detector gun barrel contact circuits has its positive main 15 connected with gun barrel 34 at any point. The negative main 16 of the current supply is shown in Fig. 1 as a common connection through one side of the solenoid coils 501, 601 and 701 of the detector and bending movement control relays 500, 600 and 700 at branch connections 161 and 162. The remote control push button switch 17 is used for starting and stopping the apparatus. The starting button of this switch causes the remote control double pole main line switch 98 to close circuits from the main supply leads 96, 97 to the apparatus.

As shown most clearly in Fig. 3, the pair of lower gears 19—20 which are driven by main central gear 18, are loose on shafts 27 and 28 but are arranged to rotate these shafts when electro-magnetic clutches 21 and 22 are energized. A second pair of lower gears 119—120 is driven by the same main central gear 18. These gears are loose on shafts 127 and 128, but are adapted to rotate these shafts when electro-magnetic clutches 121 and 122 are energized. A third pair of lower gears 219—220 is also driven by the same main central gear 18. These gears are loose on shafts 227 and 228, but are adapted to rotate these shafts when electro-magnetic clutches 221 and 222 are energized. The upper main central gear 23 loose on central shaft 26 forms a link between opposite gears 24 and 25 which are keyed to shafts 27 and 28.

It is intended that at least two other main central gears corresponding to the one shown shall be mounted loosely on central shaft 26 and form links between pairs of opposite gears corresponding to gears 24 and 25 and like the latter keyed to shafts corresponding to shafts 27 and 28. In order, however, not to complicate the drawing, these other gears have not been shown, but they will be arranged about the central shaft 26 the same as the gears which do appear in Fig. 3. This figure also shows shafts 127—128 and 227—228 corresponding to shafts 27 and 28 and upon which it is intended that the other pairs of opposite gears shall be mounted.

Flexible couplings 29—30, 129—130, and 229—230 are connected between the pairs of lower shafts 27—28, 127—128, 227—228, and the pairs of upper shafts 31—32, 131—132, and 231—232 respectively. The upper shafts 31—32 work through pairs of right and left hand threaded traveling nuts 51—52, 53—54, and 55—56 which operate toggle presses 57, 58 and 59 on the opposite bending frames 49 and 50. These nuts have squared faces which engage the corresponding faces of frames 49 and 50 to prevent the nuts from turning when their shafts are rotated. In a similar manner the other pairs of upper shafts 131—132 and 231—232 are provided with pairs of right and left hand threaded nuts similar to those upon shafts 31—32 and which operate toggle presses corresponding to 57, 58 and 59. Fig. 5 shows the arrangement of these other pairs of shafts and the nuts 151 and 251 corresponding to nut 51, and nuts 153 and 253 corresponding to nut 53. The coöperating nuts of each of these pairs correspond to nuts 52 and 54, and each of shafts 132 and 232 will be provided with a pair of nuts 155—156 and 255—256 corresponding respectively to nuts 55 and 56. Nuts 155—156 and 255—256 appear in connection with the other bending frames shown diagrammatically in the left hand portion of Fig. 1 and these nuts are connected to toggle presses 159 and 259 corresponding to toggle press 59. The three pairs of bending frames 49—50, 149—150, and 249—250 are connected by corresponding hinged joints 47—48, 147—148, and 247—248 to the three pairs of upright arms or links 45—46, 145—146, and 245—246. These arms are connected to the base 91 of the bending movement mechanism of the apparatus by corresponding hinged joints 43—44, 143—144 and 243—244. Three pairs of equalizing springs 41—42, 141, 142, and 241—242 are provided for keeping in a normal central position the corresponding pairs of bending movement frames 49—50, 149—150, and 249—250 when the bending movements are not in operation, allowing a gun barrel to pass freely up and down between the bending movement parts without touching the same. These equalizing springs allow a gun barrel and the bending movement frame to have a floating action relative to each other at the time the bending or straightening forces are in operation. This floating action insures that all three toggle presses of any particular set may come into contact with a gun barrel at this time.

Between the opposite bending movement frames 49—50, 149—150, and 249—250 are corresponding tie rod or plate connections, or separation pieces 60, 160 and 260. These connections are designed as ties between opposite sides of the bending movement frames, and while they have been shown for clearness connecting the bottoms and tops of the frames, they may be placed in different forms at other points on the frames, so long as they accomplish the purpose for which they are designed, namely, that of preventing the opposite sides of each bending movement frame from separating at the time the bending forces are in operation. These tie pieces, whatever may be their form or shape, or whether or not they are integral with or attached to the frames 49 in any convenient manner, should be so designed and placed that free space is allowed for the movement of a gun barrel at the central point between all of the members of the bending movement frames.

The bending movement frames 50, 150 and 250 are provided with lower limit switch arms and contacts 64—65, 164—165 and 264—265 respectively which automatically open the electrical circuits controlling the individual bending movement mechanism when the traveling nuts operating the toggles or other form of bending movement have reached their maximum positions. In the bending or straightening operation these limit switches are not necessarily opened for the reason that the maximum bending movement for which the limit switches are adjusted should be beyond the point required for the maximum bending movement that will be required for correcting the greatest deflection or bend in the bore of a gun barrel. These limit switches are primarily designed and adjusted to serve as safety cutouts so that the circuits controlling the bending movement mechanism will be automatically opened and the mechanism stopped before any damage is done to the machine if for any reason the normal stop devices or cutouts fail to operate.

Similar upper limit switch arms and contacts 66—67, 166—167, 266—267 also mounted on bending movement frames 50, 150 and 250 serve automatically to open the electric circuits controlling the resetting or bending movement mechanism when the resetting operation has been completed. On the completion of any bending movement and when the circuit controlling this particular movement has been opened on detector contact bars as the fault has been corrected, other circuits are closed that cause the bending movement mechanism to be reset or restored to normal "off" position, as will hereinafter appear.

As an alternative for the toggle presses shown in Fig. 1, a bending mechanism of the form shown in Fig. 16 may be used. In this form pairs of traveling nuts 351—352, 353—354 are provided with inclined surfaces which bear against corresponding inclined surfaces of bending movement blocks 357 and 358 which are suspended by link connections 371—372, 373—374 from the frames 349 and 350. As in the case of the toggle presses, any number of these last described bending movement mechanisms may be used.

A fault detector tube rod 33 over which passes the gun barrel 34 that is to be straightened, is kept in the center of the gun barrel by guiding bushings at the top and bottom of the same. The bushing 36 at the top of the gun barrel is a separate bushing fitted to each gun barrel before it is placed in the straightening machine, while the bushing at the bottom of the gun barrel is formed by a projection of the upper part of the gun barrel lifting cradle support 35. The detector tube or rod 33 is fitted at a central point with three or more radial segmental contact bars 61, 62 and 63, the outer faces of which are embraced within a circle slightly less in diameter than the bore of the gun barrel with which the detector is to be used and which are so designed that the gun barrel bore, if perfectly straight, will not touch any of these contacts in traveling over the detector tube or rod. If, however, there is a kink or bend in the gun barrel bore one or two of the contacts will come into contact therewith, thereby establishing circuit connections that control the mechanism of the machine for first finding the center of the kink or bend, then bringing the bending movement mechanism of the machine into operation to remove the defect and finally to cause the ejecting and feeding portion of the apparatus to remove the corrected gun barrel and take on a new gun barrel, as will be explained more in detail hereinafter.

The contact bars 61, 62 and 63 are electrically connected with corresponding detector relays 500, 600 and 700 through which they control and operate the various parts of the machine. The windings of these relays are connected to the detector contact bars 61, 62 and 63 by means of wires 361, 362 and 363 respectively which pass as a cable up through the detector tube 33.

The gun barrel bushing and cradle-lifting support 35 lowers and lifts a gun barrel 34 over detector tube 33 by means of cables 94 and 194 attached to drums 70 and 170 on shaft 192. For clearness there has been shown in Fig. 1 only one lifting cable 94 and one drum 70. The cable is shown slightly to one side of the gun barrel and attached to the lower end of the lifting support 35. The actual method by which the cables 94 and 194 are attached to the lower member of the lifting support 35, and the manner in which they are suspended from the drums 70 and 170 is shown in Figs. 10, 11 and 16.

On the same shaft with drums 70 and 170 is a main operating drum 72 over which the main lifting cable 92 passes, the other end of this cable being attached to drum 5. It will be seen from the drawings that the difference in size between the winding drums 70, 170 and 72 makes a reduction in speed of the gun barrel lifting cables 94 and 194 with relation to the speed of the primary lifting cable 92 and the secondary lifting cable 93 which is attached at its upper end to a cross head 77 carrying an auxiliary pulley 76. The reason for producing this difference in cable speeds is to increase the accuracy of operation by causing a relatively great amount of the primary and secondary lifting cable to be taken up for a relatively small amount of cables 94 and 194. In connection with the lifting drums, a counterweight drum 71 is provided. This counterweight drum is shown smaller than the large operating drum 72 in order to show its application more clearly in Figs. 1 and 7, but it will be understood that this counterweight drum may be made of any size suitable for the work to be done. A lifting cable 95 passing over an idler pulley 73 connects the counterweight 195 with the counterweight drum 71. The main winding cable 92 passes over idler pulleys 74 and 75 and under the auxiliary traveling idler pulley 76 which, as above described, is attached to one end of the secondary lifting cable 93.

The cradle-lifting support 35 serves as a guide bushing for the lower end of the gun barrel as well as a cradle-lifting support or carrier for receiving a gun barrel at the magazine or upper end of the machine and for supporting a gun barrel as it is being initially lowered to its starting position at the bottom of travel and throughout the complete cycle of operations of locating and correcting faults in the gun barrel. The bore through the center of lifting support 35 through which the detector tube 33 passes and is guided in a central position is provided with grooves 351, 352 and 353 (Fig. 13) to allow the detector tube contact bars 61, 62 and 63 to pass through the support when the gun barrel is lowered over the detector tube 33. The grooves 351, 352 and 353 are flared out at the top and bottom to receive more readily the contact bars of the detector tube, which should be tapered at the top and bottom in order that they may easily find and pass through the grooves in the support. At the top of the gun barrel is an upper centering guide bushing 36 through which the upper portion of the detector tube 33 passes and is guided as the gun barrel passes thereover. It is not necessary for this bushing to be grooved, as the detector contact bars do not pass through the same.

A pair of contacts 37 and 38 constitute a control switch at the upper end of the gun barrel movement for making the electrical circuit connections that control the feeding and ejecting of gun barrels that are passing through the machine. A limit switch 39 and contact piece 40 at the lower limit of the gun barrel movement are so placed that the support 35 when striking the switch arm on descending, opens a non-interference circuit which releases the ratchet pawl and locking circuit arm 103 of the non-interference relay 100, thus allowing electrical and mechanical mechanisms to become operative to start the gun barrel on its upward movement over the detector tube 33 to locate faults in the gun barrel and correct the same as explained more in detail hereinafter.

Circuit is established between limit switch arm 39 and contact piece 40 as soon as the gun barrel 34 starts on its upward movement, but the non-interference circuit is not closed until the proper time when, at the end of the upper movement of the gun barrel the bottom of the lifting support 35, strikes upper limit switch arm 69 and, through contact 68, establishes the non-interference locking-out circuit through relay 100 and also closes a circuit connection through contacts 37 and 38 of the upper limit switch to start into operation the electrical and mechanical mechanisms for feeding gun barrels to the support and for removing from the support the gun barrel that has just passed through the machine.

The secondary lifting cable is in two sections between which is a movable frame 78 adapted to reciprocate in guides 79 and carrying a cam switch mechanism for automatically opening contacts 83 and 84 and closing contacts 85 and 86 on the downward motion of the frame 78, and for opening contacts 85 and 86 and closing contacts 83 and 84 on the stopping and reversal to the upward movement of the frame 78. A button or extension plunger 80 on the cam switch device of the movable frame 78 is so placed that at the limit of upper movement of the auxiliary pulley 76 the button or extension plunger 80 will strike the lever 405 of the master bending movement control relay 400. This plunger 80 is connected to one end of a 2-arm lever 82, pivoted at 282 the other arm of which carries a pair of contact plates adapted to engage either the contacts 83—84 or 85—86, according to the position of the lever. A spring 81 holds one arm of the lever against the cam 88 which is associated with the roller 87 mounted upon a pin projecting from the movable frame 78. Rotation of the roller 87 according to the direction of movement of the frame 78 will, through the cam 88, actuate the lever 82 and with it the plunger 80. These parts are so designed that the cam will have only a limited degree of movement, and after the contact on lever 82 is brought against contacts 83 and 84 the roller 87 will merely drag along the guide 79 with which it is in contact. The purpose of this arrangement is to insure that when the plunger 80 strikes the lever 405 of relay 400 the impact will cause the lever 82 to swing so as to close contacts 85 and 86, which is necessary for the operation of the apparatus, as will hereinafter appear.

The lower section of the cable 93 is connected between the frame 78 and the secondary winding drum 7.

Above the bending mechanism and its associated parts is the mechanism for feeding gun barrels to the first named mechanism and for removing them therefrom after any faults therein have been corrected. This mechanism is shown in Figs. 7, 8 and 9, and comprises a base 133 placed above the pulleys and drums. The base is provided with an aperture to receive the gun barrel support 35 when raised to its top position.

The detector support or tube 33 should be kept under tension during the operation of locating and correcting faults in the gun barrel. In order to attain this object and at the same time permit the gun barrel support to pass into the position shown in Fig. 7, a gripping device is provided. This device comprises a pair of cams 109—209 associated with meshing gear wheels 110—210 mounted on shafts 112—212. Upon shaft 112 is a drum 108 over which a cord 107 attached to the weight 111 passes. On the shaft 212 is a drum 211 having wound thereupon a cord 216 which is connected to the plunger of a solenoid 116.

The mechanism and electrical circuit connections of this clamping device are so arranged that during the time of locating and correcting faults in the gun barrel the detector tube 33 is held under tension by the two cams 109—209 operated by weight 111. During the period that the gun barrel is being lowered over the detector tube 33 into the bending movement mechanism of the apparatus, or while a gun barrel is being lifted after faults therein have been corrected, the tension device is kept in an open position to allow the gun barrel and cradle-lifting support 35 to pass.

The circuit of solenoid 116 is controlled by a directive switch 113 which in practice will be located at such a distance below the clamping device that after a gun barrel has passed entirely through the latter, it will engage a roller associated with the switch to move the latter to " off " position 115 where it breaks the circuit of solenoid 116, thus allowing the weight 111 to bring the cams 109 and 209 into position to grip the detector tube 33 and at the same time tend to put the tube under tension. After the gun barrel has been operated upon by the fault locating and correcting mechanism it is lifted again to the position shown in Fig. 7 and as it comes in contact with the roller associated with switch 113 it moves the switch to the " on " position 114, thus closing the circuit of solenoid 116 from supply main 97, branch connection 978, 979, switch arm 113, contact plate 114, solenoid 116, branch connection 9610, branch connection 969, to the other supply main 96. Lifting of the plunger of the solenoid 116 separates the cams of the clamping device to permit the free passage therethrough of the gun barrel and its lifting support. As long as the support is above the clamping device the cams of the latter will be separated as shown in Fig. 7; instead of having the weight 111 close the clamping device and the solenoid 116 open it, the apparatus could be arranged to operate in a reverse manner.

On the base of the feeding and ejecting mechanism are mounted vertical shafts which carry cylinders 117—118 having at their bases flanges or racks containing pegs 137 and 138 respectively, for holding gun barrels in position. In Fig. 7 a gun barrel 34 in position upon the support 35 is shown.

134 represents a gun barrel which has been brought into position by the feeding mechanism to be transferred to the support when the gun barrel 34 is removed therefrom into the position indicated in dotted lines at 334. 234 indicates the other gun barrels in position upon the rack of the feeding cylinder. Beneath the cylinders 117, 118 are gears 217, 218, connected by an idler gear 226 which is mounted upon a bearing surrounding the aperture through the base of this portion of the apparatus. The feeding and ejecting carriages 117, 118 are rotated through the above train of gears by means of a solenoid 161, the plunger 162 of which is retracted by a spring 163 and carries a pawl 168 which engages a ratchet ring on the top of cylinder 118.

Gun barrels are lifted from the rack of the feeding cylinder 117 by a magnetic clutch device which is mounted on a support 171 and operated by a motor 172, the circuit terminals of which are indicated at 139 and 140. Upon the shaft of the motor is a pinion 173 which engages a gear 174 having upon its shaft a pinion 175 meshing with a main gear 176 on a shaft 177, to which is attached a slotted crank arm 178. A plate 179 for opening the switch 135, 136 is attached to the outer end of the crank arm. The movable member 135 of the switch is provided with a dashpot or other form of retarding device 235 in order that it may not immediately close its contacts when the plate 179 passes out of contact with 135. The support 171 comprises three depending plates as shown in Fig. 8 and cut into the inner faces of two of these plates are cam grooves 180 in which is fitted a pin 181 which passes through the slot of the crank arm 178 and upon which is suspended by means of a lug 183 the electromagnetic clutch 182. The latter is provided with coils 184 which are in circuit with the solenoid 161. The outer poles 185 and 186 of the clutch are hinged as shown, while the center pole piece 187 is made stationary. The object of the pivoted construction of the outer pole pieces is to permit them to obtain a firmer grip upon the ends of the gun barrels, as shown in Fig. 7. On the shaft 177 is a resetting drum 190 upon which is a cable 189, passing over idler pulleys 188 and to the end of which is attached a weight 191.

The automatic feeding and ejecting device is controlled by a solenoid 200 having a winding 201 and a plunger 202 on which is a pair of contact disks 203—204 adapted when the solenoid is energized to bridge the contacts 205—206 and 207—208. The circuit of this solenoid is controlled by the switches 37—38 and 135—136.

For controlling certain circuits of the apparatus a main cutout relay 300 is provided. This relay has a winding 301 and plunger 302 upon which is mounted a pair of disks 303—304 adapted when the relay is deënergized to bridge contacts 305—306, and 307—308.

400 represents the master bending movement control relay and a non-interference locking-out device. It is provided with a solenoid winding 401, a plunger 402 having an upper contact disk 403 and lower contact disk 404. The upper contact disk is adapted to bridge contacts 406—407 when the plunger is lifted. The lower contact disk contacts 408—409 when the plunger is attracted and contacts 410—411 when the plunger is released. Immediately below plunger 402 is the lifting lever 405 which in its normal position engages the contact 412, and when raised by the plunger 80 on the frame 78 lifts the plunger 402 of the solenoid into its attracted position, where it is held by a locking circuit established through disk 403 and contacts 406—407 through the coil of the relay. The plunger 402 is provided with an adjustable retarder 413 for causing a slow release of the plunger.

The detector control relays 500, 600 and 700 have been described previously as being connected to the detector contact bars 61, 62 and 63. These relays are all alike and the contacts thereof are shown in Figs. 19, 20 and 21. Referring to Fig. 19, the plunger of the relay is shown at 502 and upon it are mounted two contact disks 503—504 adapted when the relay is deënergized to engage contacts 507—508 and 511—512 respectively. When the coil 501 of the relay is energized the contact plates engage contacts 505—506, and 509—510. Relays 600 and 700 are each provided with similar plungers 602 and 702 respectively, contact disks 603—604 and 703—704 respectively and contacts 605—606—607—608—609—610—611—612 and 705—706—707—708—709—710—711—712 respectively, as shown in Figs. 20 and 21.

In the construction shown in Fig. 1, only one or perhaps two of the detector relays will be energized, corresponding to the detector contacts which engage the inside of the bore of the gun barrel. The non-energized relay or relays will be inoperative. It will be understood that in order to insure the locking-out of the non-energized relay or relays, any suitable mechanical or electrical means may be provided for this purpose.

The winding drum clutches 6 and 8 are controlled by relays 800 and 900 provided with a winding 801, 901, a pole piece 802, 902 and an armature 803, 903, respectively. The armatures are adapted when released to engage contacts 805, 905 respectively, and when attracted to engage upper contacts 804, 904 respectively, for the purposes which will be hereinafter pointed out when the operation of the apparatus and circuit connections is considered.

The operations of the above described mechanisms and circuit connections are as follows:

With the master main line switch 98 in an "open" position, all the electric current is cut off from the machine, the electric brake 105—106 with other brakes (not shown) hold the various moving parts of the machine in the same fixed position that they were in at the moment the master main line switch was opened. (Note: For clearness only one brake equipment 105—106 is shown.)

Before starting the machine, the revolving gun barrel carriage 117 is filled with gun barrels to be straightened, and with the other revolving carriage 118 empty, the "start" button of the double push button switch 17 is pressed, making a contact which operates and closes master main line switch 98 which first lifts the brakes and starts the machine in operation by closing the following circuits.

(a) Circuit from positive main 97, branch connection 971, through brake solenoid winding 106, (another similar brake winding not shown) to negative main 96 at branch connection 961. This magnetizes the brake solenoid which lifts brake shoes and allows free movement of all parts of machine.

(b) Circuit from positive main 97, branch connection 972, through normally closed limit switch contact 40 and arm 39, through relay winding 101 of non-interference relay 100, through the upper limit switch contact 68 and arm 69 (which had been closed by the last preceding gun barrel to pass out of machine) through branch connection 969, through solenoid winding 301 of main cut-out relay 300, to negative main 96 at branch connection 962, thus magnetizing relay core 102 of relay 100 which attracts and holds armature 103, against contact 104, thereby locking this circuit to the contact 104 through winding 101 of relay 100 and through solenoid winding 301 of main cut-out relay 300. This locked circuit remains closed until the normally closed connections between lower limit switch arm 39 and contact 40 has been opened by the gun barrel cradle lifting support 35, reaching its lower limit of travel.

The closing of the previous non-interference circuit through solenoid winding 301 of main cut-out relay 300, opens the main connections between 305—306, 307—308 of this cut-out relay and holds them opened until the gun barrel has reached the lower limit of its travel and started on the upper motion.

(c) Circuit from positive main 97, Fig. 7, branch connection 978 to branch connection 979, through directive switch arm 113 to contact 114, through "off" position solenoid 116 of tension device, through branch connections 9611 and 9610 to negative main 96.

The directive switch arm had been left closed on contact piece 114 when previous gun barrel had been lifted from machine.

The closing of circuit through solenoid 116 releases the tension on detector tube 33 and opens the tension device so that the next gun barrel can be lowered through the tension device without touching any part of the equipment.

(d) Circuit from positive main 97, branch connection 978 to contact 205 of relay 200, through solenoid winding 201 of relay 200 through switch contact 136 and limit switch arm 135, across control switch contacts 37 and 38 of upper limit switch, through branch connections 9611 and 9610 to negative main 96 at branch connection 969. The closing of this circuit through solenoid winding 201 closes connections across contacts 205, 206, 207 and 208 of relay 200, thereby establishing circuit connections between the positive and negative mains 97 and 96 to the automatic feeding and ejecting mechanism of the machine.

It should be noted that the circuit traced above, viz., from positive main 97, branch connection 978 to relay contact 205, through solenoid 201 of relay 200, through limit switch contact 136 and arm 135, across auxiliary contacts 37 and 38 of upper limit switch, through branch connections 9611 and 9610 to negative main 96, will lock and hold closed the relay contacts 205, 206, 207 and 208 until circuit is broken across auxiliary contacts 37 and 38 of upper limit switch.

Relay 200 closes circuit from positive main 97, branch connection 978, across the upper contacts 205 and 206 of relay 200, to branch connection 9710 where the circuit branches, one branch of which goes through solenoid 161 of turning movement ratchet device for revolving the gun barrel carriages 117 and 118, through coil 184 of gun barrel lifting magnetic clutch to negative branch connection 9612. The other branch circuit 9710 goes through the motor 172 by terminals 140 and 139 and back to negative branch connection 9612 where the common return for both branches passes through lower contacts 208 and 207 of relay 200 to negative main 96 at branch connection 969.

The closing of the above branch circuit through the gun barrel lifting magnetic clutch 182 magnetizes this clutch and attracts and holds the first gun barrel 134. At the same time the other branch circuit through the motor 172, starts the motor which drives a chain of gears 173, 174, 175 and 176 which rotates the gun barrel lifting crank arm shaft 177 carrying the main suspension pin 181 of magnetic clutch through the cams 180 in frame of gun barrel lifting frame. This movement lifts the gun barrel 134 from the carriage 117 and transfers and places it on the gun barrel lifting support 35. As the gun barrel 134 is placed on the lifting support 35 the electric connections across limit switch arm 135 and contact 136 are broken by the plate 179 on crank arm 178 striking the limit switch arm 135. This breaks the circuit connections through the motor 172, magnetic clutch 182 and solenoid 161 of ratchet revolving device, thereby stopping the movement of the crank arm carrying the magnetic clutch with the gun barrel upon it and also releasing the grip of the magnetic clutch 182 on the gun barrel, which allows the gun barrel to take its position on the gun barrel cradle lifting support 35. As the circuit was broken through the motor 172 and magnetic clutch 182 the spring 163 operating through the ratchet pawl 168 rotates the two gun barrel carriages 117 and 118 which are geared together by center gear 226 one step, which brings another gun barrel 234 on the carriage 117 into position to be taken off by the next movement of the magnetic clutch lifting device. At the same time the magnetic clutch is returned by spring or weight 191 to the position shown in Fig. 7. Even although plate 179 passes out of contact with switch arm 135, the latter will not immediately close the circuit of relay 200 on account of the retarding device 235. As soon as the gun barrel is released by the deënergization of the magnetic clutch it begins to drop and immediately opens switch 37—38 in the circuit of relay 200. There are thus two breaks in the circuit of this relay thereby insuring that it will not be energized again until the gun barrel has come back to its uppermost position to be ejected.

The next movement of this magnetic gun barrel lifting device will be not only to lift another gun barrel from carriage 117 and transfer it to the gun barrel carriage lifting support 35, but at the same time pick up a gun barrel that has been straightened and ejected, and transfer and place it on the revolving carriage 118 for gun barrels that have been straightened. As the gun barrel 34 is placed on the gun barrel cradle support 35 the weight of the gun barrel carries itself down over detector tube 33 to bottom of travel where the upward movement is automatically started.

The gun barrel 34 in dropping initially over detector tube 33 through the bending mechanism to starting position causes the lower portion of gun barrel cradle lifting support 35 to strike the contact arm 39 of normally closed limit switch, thus breaking the non-interference circuit which had previously closed through this limit switch arm 39 and contact 40, solenoid 301 of main cut-out relay 300 and coil 101 of non-interference and locking relay 100 which had prevented any electrical contact making or bending movement while the gun barrel 34 was traveling from the upper deck of machine to the lower end of travel. The breaking of the non-interference circuit allows to drop into normal position the plunger 302 of main cut-out relay 300, thus again establishing the main line circuit connections of both positive and negative mains 97 and 96 across contacts 305, 306, 307 and 308 of relay 300, also breaking the locked in circuit connection which had been previously closed through coil 101, armature ratchet pawl 103 and contact 104 of relay 100.

The upward movement of gun barrel 34 is started after the non-interference circuit has been broken at lower limit switch arm 39 and contact 40 by mechanical and electrical movements put into operation by completing the following electrical circuit connections.

From positive main 97 at branch connection 973 through upper contacts 305 and 306 of relay 300, through lower contacts 410, 411 of relay 400, through branch connection 975 to armature 803 and lower contact 805 of relay 800, through clutch coil 6 to branch connection 965 and 964, through lower contacts 308 and 307 of relay 300 to negative main 96 at branch connection 963, thereby magnetizing clutch coil 6 causing it to hold fast the primary winding drum 5 which then rotates with shaft 4, winding up cable 92 on primary winding drum 5. This operation lifts the gun barrel 34 by rotating gun barrel lifting cable shaft 192, as the cable 92 unwinds from the large operating drum 72 and is pulled around two stationary idler pulleys 74 and 75 and traveling pulley 76, which is also stationary at this time, at the upper limit of its travel. If the bore of the gun barrel 34 is not defective, the winding drum 5 continues to lift the gun barrel to the upper deck of machine where it is automatically ejected and transferred to the revolving carriage 118 and another gun barrel 134 is taken on, and drops to the bottom of travel to go through the upward movement.

If, however, the bore of the gun barrel is not straight, the convex portion of the bend will come into contact with one or two of the detector contact bars 61, 62 or 63 of detector tube 33, the making of which contact causes the electrical and mechanical movements to start to operate, that will first locate the fault, then stop the movement of the gun barrel at the proper point for correcting the fault, and then after the fault has been corrected to again start the gun barrel on its movement up through the machine where after all faults have been located and removed, the gun barrel is ejected and another one taken on for correction. This movement is brought about through the following circuit connections:

Suppose, for example that the convex portion of the bend in the bore of the gun barrel touches and makes contact with contact bar 61 of detector tube 33, connections will then be established between low potential electrical supply 14, positive main 15 to gun barrel 34, to contact bar 61, through detector tube 33 by wire 361 to solenoid 501 of relay 500, through branch connections 162 and 161 to low potential main 16, to negative side of supply. The closing of this circuit energizes coil 501 of relay 500, lifting plunger 502 with two contact disks 503 and 504, breaking contacts 507—508 and 511—512, and closing contacts 505—506 and 509—510, the closings of which cause a change in current flow from main current supply 96 and 97 as follows:

From branch connection 973 across contacts 305—306 of relay 300, across contacts 410—411 of relay 400 to point 975 where a tap is taken for relay 800, thence to 803, through coil 801 of relay 800, through contact 905 and armature 903 of relay 900 to contact 412 and arm 405 of relay 400, to branch connection 977, which is a common branch connection for vertical bending shaft electric clutches 21—22, 121—122, and 221—222, through clutch winding 21 and 22 by wire 561 to and across contacts 509-510 of relay 500 which have just been closed, to contact 506, to branch connection 964 of negative main 96. The closing of this circuit energizes clutches 21 and 22 holding fast the loose running gears 19 and 20 with the two other pairs of lower gears 119—120 and 219—220, meshing with center gear 18 connected to center bevel gear 13 by shaft 26, but as no circuit has yet been closed to either the main bending clutch 12 or resetting clutch 10 on shaft 4, the vertical bending-shafts 27 and 28 are not rotated but are ready to rotate either in a forward or reversed direction, depending upon which of the driving bevel gears 11 or 9 controlling the bending movement or resetting movement of machine are driven. The circuit just closed also energizes coils 801 of relay 800 which lifts armature 803, breaking contact 805 connected to clutch 6 which is driving winding drum 5, and makes connection with upper contact 804, thus establishing a circuit through contacts 85 and 86 of traveling frame 78, through clutch 8 to branch connection 965 of negative main 96. This circuit connection releases primary winding drum 5 which ceases to rotate with shaft 4 due to breaking of connection through clutch 6 which held drum 5.

Winding drum 5 is now prevented from rotating in reverse direction by ratchet pawl 103 engaging ratchet teeth on rim of drum 5. As the circuit is broken through clutch 6 it is closed through clutch 8, and clutch 8 is now energized and held fast to secondary winding drum 7, which rotates with shaft 4 and continues to lift gun barrel by winding cable 93 on drum 7. As one end of cable 92 is held fast and prevented from unwinding from drum 5 by ratchet pawl 103, the winding of cable 93 on drum 7 pulls the traveling pulley 76 down between idler pulleys 74 and 75, causing cable 92 to be pulled around idler pulley 74 from drum 72 which rotates lifting shaft 192 with gun barrel lifting cable drums 70 and 170. The gun barrel continues to be lifted by this secondary method until the end of convex bend in bore of gun barrel is reached, when the low potential circuit connection between contactor bar 61 and gun barrel will be broken. The opening of this circuit deënergizes relay 500 which breaks the circuit of relay 800. The circuit of clutch 8 is then broken at 803—804 and drum 7 is released from clutch 8. As drum 7 is free to rotate on shaft 4, it allows cable 93 to be unwound due to the weight of a gun barrel on one side and the pull on the cable on the other side that is again being wound up on primary winding drum 5, due to the fact that when the circuit of clutch 8 for winding drum 7 is broken, the circuit of clutch 6 for winding drum 5 is again made at contacts 803—805.

This combination of movements allows the gun barrel to fall back just half the distance that it has moved upward from the time the first contact was made between gun barrel bore and detector contact bar 61 due to the fact that when the secondary winding movement started, all the cable taken up operated to lift the gun barrel, while of the amount of cable that was taken up on the release only one-half was played out to the gun barrel while the other half was taken up on primary winding drum 5. This method automatically brings the gun barrel bend or deflection that has just been detected and gone over, back in position where the center of the bend is on line with the detector contact bars which are also on line with the center of the bending movement mechanism, which allows the bending movement necessary to straighten the bend to be applied to center of each bend detected.

In the movement made by the traveling pulley 76 to its normal position which it occupied before cable 93 began to wind on drum 7, the plunger 80 on traveling frame 78 (carried by cable 93) strikes the projecting portion of lever 405 of master bending movement relay 400, breaking circuit between 405 and 412 and lifting the plunger 402 with two contact disks 403 and 404, thus breaking connection across lower contacts 410 and 411 and making connection across contacts 406 and 407, and 408 and 409. The lifting of plunger 402 and the breaking and making of circuit connections just given at master bending movement relay 400 establishes circuit connections, as follows:

From positive main 97 at branch connection 973, through upper contacts 305 and 306 of relay 300, through solenoid 401 and locking in circuit contacts 406 and 407, through bending movement clutch 12 to common connections on lower limit switch arms 264, 164 and 64, on bending movement frames 250, 150 and 50. As only one of the low potential relay solenoids (501) has been energized, the circuit is continued to limit switch contact 65 to and across top contacts 505 and 506 of relay 500, through branch connection 964 to negative main 96, thus energizing main clutch 12 and holding fast bevel gear 11 causing same to rotate with shaft 4. At the same time that the foregoing circuit has been closed to clutch 12, the circuit which previously had been closed through vertical shaft clutches 21 and 22 through contact 412 of relay 400, is broken momentarily and closed again on an independent connection across contact 408 and 409, and as these clutches 21 and 22 are energized they hold fast the two bending shafts 27 and 28 to the driving gears 19 and 20, thereby rotating shafts 27 and 28 with their extension shafts 31 and 32.

The rotations of the extension shafts 31 and 32 cause the pairs of traveling nuts 51—52, 53—54 and 55—56 to move toward each other, by the set of right and left-hand threads on shafts 31 and 32.

The movements of these nuts toward each other operate the toggle arms connected between the nuts and the toggle nose pieces 57, 58 and 59 and cause the said nose pieces to move toward the gun barrel, and after coming into contact with gun barrel to exert a bending movement on gun barrel in the desired direction, which, on proper adjustment of parts, will cease to be exerted after the bend or deflection has been straightened, due to the breaking of circuit connection between detector contact bar 61 and gun barrel 34 which contact not only located the defect and brought the gun barrel to a proper central point for correction, but also has controlled the amount of bending necessary to straighten the particular gun barrel. The breaking of the circuit connections between contact bar 61 and gun barrel 34 releases plungers 402 and 502 on relays 400 and 500 respectively, but owing to retarder 413 the contacts of relay 400 are not broken until the bending force has been applied for a predetermined time dependent upon the adjustment of the retarder.

Final release of plunger 402 reëstablishes normal circuit connections for first resetting bending movement parts and then continuing the upper movemet of gun barrel and for locating and correcting the next fault.

The circuit connections just established for resetting bending movement to normal "off" position are as follows:

On the dropping of plunger 402, the contact disk 404 closes the electrical circuit from positive main 97 across contacts 410 and 411, through solenoid 901 of relay 900, then through resetting clutch 10, through connection 511' across the series of contacts 507—508, 607—608 and 707—708 through branch connection 964 to negative main 96. This passing of the resetting circuit across the series of common contacts 507—508, 607—608 and 707—708, of low potential relayes 500, 600 and 700 respectively, makes it impossible for resetting clutch 10 to be energized at the same time as bending clutch 12, or vice versa, impossible for clutch 12 to be energized while clutch 10 is energized and in operation. This closing of circuit through clutch 10 holds fast the bevel gear 9 and rotates it with shaft 4 causing central bevel gear 13 with lower set of gears operated by central shaft 26 to rotate in reverse direction from what it rotated for bending movement. The closing of the circuit just described through coil 901 of relay 900 energizes relay coil 901 and lifts armature 903, establishing another circuit in multiple with circuit just described. This circuit is closed from branch connection 975 on positive main 97 to common connection on armature 803 of relay 800 to upper contact 904 and through armature 903 of relay 900, through contact 412 and lever 405 of relay 400 to common connection for vertical bending shaft clutches at 977, through clutches 21 and 22, through branch connection 966 to limit switch arm 66 on bending moving frame 50 to contact 67, which had been previously closed on starting of bending movement, to and across contacts 512 and 511, to and through the series of contacts 507—508, 607—608, and 707—708, through branch connection 964 to negative lead 96.

The closing of this circuit through clutches 21 and 22 and the other circuit through clutch 10 cause the rotation of extension shafts 31 and 32 in a reverse direction which separates the three pairs of traveling nuts 51—52, 53—54 and 55—56 and restores them to their normal "off" position or to where they were before bending movement started.

The resetting movement of the machine is stopped by the opening of the limit switch contact between limit switch arm 66 and contact 67 due to the projecting pin or plate on traveling nut 54 striking and lifting limit switch arm 66 on "up" movement. This interrupts the circuit through vertical shaft clutches 21—22 thereby stopping rotation of shafts 27 and 28 with their extension shafts 31—32, but the lower set of gears with resetting bevel gear 9 continue to rotate until the circuit is interrupted by any one of the low potential relays becoming operative again.

Returning now to the movement of traveling frame 78 at the time that cable 93 is being wound and unwound in order to give the function of the transfer switch and cam movement assembly on traveling frame 78.

The function of this traveling frame assembly is to insure a circuit across contacts 85 and 86 to secondary winding drum clutch 8 on the "down" movement of traveling frame 78, while cable 93 is being wound up on drum 7 and to break this connection between contacts 85 and 86 at the time traveling frame stops at the end of "down" movement due to breaking of connection between detector contact bar 61 and gun barrel, and starts on return "up" movement.

The start of the up movement of traveling frame 78 against guide frame 79 causes the cam 88 on roller 87 to break circuit connection across contacts 85 and 86 and at the same time to make connections across contacts 83 and 84 which shunts the connection across coil 801 of relay 800 which together with the breaking of circuit through clutch 8 prevents the secondary winding drum 7 from beginning to wind again, as the detector contact bar 61 comes into contact with the bend in bore of gun barrel on its "up" motion, to center of bend. The breaking of circuit connection across contact 85 and 86 and shunting of relay coil 801 of relay 800 reëstablishes and insures the circuit connection through clutch 6 causing primary winding drum 5 to rotate and take up half of the slack in cable 92 as it is being reeled off from drum 7, the other half of slack in cable 92 is being taken up on drum 72 as the gun barrel 34 drops by gravity and action of counter-weight 195, back to proper center point of bend of gun barrel bore, where the proper bending forces can be applied for straightening the bend in gun barrel bore.

Were this transfer switch not provided on the traveling frame 78 or other similar movement placed at some other part of machine, the return of gun barrel to central point could not be accomplished by the method which I have described for the reason that after the stopping of winding of cable 93 on drum 7 due to the breaking of low potential connection between detector contact bar 61 and bend in gun barrel, the "up" motion of traveling pulley 77 would start only to be pulled down again as detector contact bar 61 came into contact again with gun barrel, this would result in a seesaw (up and down) movement of traveling pulley 76 which would accomplish nothing and prevent any further movement of machine.

Of course means could be provided for breaking the circuit connection at another point between detector contact bar 61 and gun barrel and thereby prevent this seesaw motion, but in the device which I have invented, I desire to preserve the circuit closed across detector contact bar 61 and gun barrel (or other contact bars 62 or 63 and gun barrel) to serve not only as a means of locating faults but also to serve as a means of stopping bending movement by the breaking of this contact at the moment that the bending movement mechanism has corrected the defect.

The extension button or plunger 80 on top of traveling frame 78, not only serves for lifting plunger 402 of master bending-movement relay 400 and starts the bending movement to operate, but also serves to break connection between contacts 83 and 84 and close connection between contacts 85 and 86, restoring the connections required for the next downward movement of traveling frame 78. This transfer of connections on traveling frame 78 is accomplished at the time that plunger 80 strikes the lever arm 405 of relay 400, the force of the pressure against the plunger 80 which is connected to one end of transfer switch arm 82 moves the switch arm over, breaking connection across contacts 83 and 84 and closes connection across contacts 85 and 86.

Various modifications or changes in the details of construction of my invention may be made without departing from the principle thereof.

I claim:

1. In apparatus for correcting faults in tubular members, the combination of a fault detector, means for automatically lowering a tubular member over the fault detector, and means for thereafter producing relative movement between the tubular member and the fault detector to locate faults in the member.

2. In apparatus for correcting faults in tubular members, the combination of a fault detector, means for producing relative movement between the tubular member and the fault detector to locate faults in the member, and means for thereafter automatically raising the tubular member from the fault detector.

3. In apparatus for correcting faults in tubular members, the combination of a fault detector, means for automatically lowering a tubular member over the fault detector, means for producing relative movement between the tubular member and the fault detector to locate faults in the member, and means for thereafter automatically raising the tubular member from the fault detector.

4. In apparatus for correcting faults in tubular members, the combination of a fault detector, means for automatically lowering a tubular member over the fault detector, and means for automatically placing tubular members in succession upon said lowering means.

5. In apparatus for correcting faults in tubular members, the combination of a fault detector, means for automatically lowering a tubular member over the fault detector, means for automatically placing tubular members in succession upon said lowering means, means for producing relative movement between the tubular member and the fault detector to locate faults in the member, and means for thereafter removing the tubular member from the lowering means.

6. In apparatus for correcting faults in tubular members, a fault detector, a support for carrying a tubular member over said fault detector, a feeding carriage adapted to carry a plurality of tubular members, means for bringing said tubular members one at a time adjacent to said support, a removing carriage adapted to carry said tubular members away from said support, and means for automatically transferring said tubular members in succession from said feeding carriage to said support and from said support to said removing carriage.

7. In apparatus for correcting faults in tubular members, a fault detector including a plurality of contacts and a device upon which said contacts are supported, a member for supporting a tubular member, there being an aperture in said supporting member through which said device is adapted to pass, and also grooves through which said contacts are adapted to pass to permit said supporting member and tubular member carried thereby to pass over said fault detector whereby the contacts thereof may engage the inside of said tubular member at points of fault therein.

8. In an apparatus for correcting faults in tubular members, a fault detector, a support for passing tubular members over said fault detector, a feeding rack, a magnetic clutch adapted to engage the tubular member, means for moving said clutch to transfer tubular members from said feeding rack to said support, a motor for actuating said clutch moving means, means associated with said clutch moving means for stopping the operation of said motor and deënergizing said clutch when said clutch has transferred a tubular member from said rack to said support, and means for thereafter actuating said moving means to restore the clutch to normal position for another transferring operation.

9. In apparatus for correcting faults in tubular members, a fault detector, a device upon which said detector is mounted, a movable support adapted to carry a tubular member over said fault detector, mechanism for clamping one end of said device, means for operating said mechanism to engage said device, means for operating said mechanism to release said device and means actuated by movement of said support for controlling both of said operating means.

10. In apparatus for correcting faults in tubular members, a fault detector, a device upon which said detector is mounted, a member adapted to support a tubular member and provided with a central aperture through which said device may pass and formed to enter one end of a tubular member whereby the device may be centered therein, and means adapted to be inserted into the other end of a tubular member and provided with a central aperture through which said device may pass to center the same within said other end of the tubular member.

In testimony whereof I affix my signature.

ERNEST W. MULLER.